United States Patent
Turunen et al.

(10) Patent No.: US 6,690,679 B1
(45) Date of Patent: Feb. 10, 2004

(54) METHOD AND SYSTEM FOR BEARER MANAGEMENT IN A THIRD GENERATION MOBILE TELECOMMUNICATIONS SYSTEM

(75) Inventors: Matti Turunen, Tampere (FI); Juha Kalliokulju, Vesilahti (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/334,004

(22) Filed: Jun. 15, 1999

(30) Foreign Application Priority Data

Jun. 16, 1998 (FI) .................................................. 981401

(51) Int. Cl.[7] .................................................. H04J 3/22
(52) U.S. Cl. .................................... 370/469; 370/230.1
(58) Field of Search ................................ 370/229, 230, 370/230.1, 231, 232, 233, 234, 235, 468, 469, 477, 497, 498, 412

(56) References Cited

U.S. PATENT DOCUMENTS

| | | | | |
|---|---|---|---|---|
| 5,357,507 A | * | 10/1994 | Hughes et al. | 370/234 |
| 5,453,981 A | * | 9/1995 | Katsube et al. | 370/397 |
| 5,724,355 A | * | 3/1998 | Bruno et al. | 370/401 |
| 5,903,832 A | | 5/1999 | Seppanen et al. | 455/414 |
| 6,038,609 A | * | 3/2000 | Geulen | 709/250 |
| 6,088,734 A | * | 7/2000 | Marin et al. | 709/232 |
| 6,151,324 A | * | 11/2000 | Belser et al. | 370/397 |
| 6,363,058 B1 | * | 3/2002 | Roobol et al. | 370/310 |
| 6,477,670 B1 | * | 11/2002 | Ahmadvand | 370/469 |

OTHER PUBLICATIONS

"General Packet Radio Services in GSM", IEEE Communications Magazine, Oct. 1997, Cai et al.

* cited by examiner

Primary Examiner—Chi Pham
Assistant Examiner—Keith M. George
(74) Attorney, Agent, or Firm—Perman & Green, LLP (57) ABSTRACT

In a telecommunication device the handling of data to be transmitted proceeds according to a protocol stack having a L3 layer and a MAC layer. For handling data flows between the L3 layer and the MAC layer the following steps are perfomed:

- a flow of data to be transmitted coming from the L3 layer is demultiplexed into a number of component data flows, each component data flow having a certain Quality of Service requirement,
- the component data flows are arranged into groups where the Quality of Service requirement of each component data flow in a group is similar to the Quality of Service requirements of the other component data flows belonging to the same group,
- the component data flows are multiplexed groupwise into multiplexed data flows and
- the multiplexed data flows are outputted to the MAC layer.

5 Claims, 5 Drawing Sheets

METHOD AND SYSTEM FOR BEARER MANAGEMENT IN A THIRD GENERATION MOBILE TELECOMMUNICATIONS SYSTEM

TECHNOLOGICAL FIELD

The invention applies generally to the management of bearer services in a third generation mobile telecommunications system. Especially the invention applies to the establishment and upkeep of bearers for services that have different quality of service requirements between a mobile station and the fixed parts of the mobile telecommunications system.

BACKGROUND OF THE INVENTION

The denomination "mobile telecommunications system" refers generally to any telecommunications system which enables a wireless communication connection between a mobile station (MS) and the fixed parts of the system when the user of the mobile station is moving within the service area of the system. A typical mobile communications system is a Public Land Mobile Network (PLMN). The majority of mobile telecommunications systems in use at the time of filing this patent application belong to the second generation of such systems, a well-known example being the GSM system (Global System for Mobile telecommunications). The invention applies mostly to the next or third generation of mobile telecommunications systems. A system known as the UMTS (Universal Mobile Telecommunications System), which currently undergoes standardisation, is used as an example.

In third generation systems the concepts of a bearer and a service are introduced. A bearer generally corresponds to the older concept of a traffic channel, defming for example the user data rate and Quality or Service (QoS) that will be provided by the system for transferring information between a mobile station and some other part of the system. For example a bearer between the mobile station and a base station is a radio bearer and a bearer between a radio network controller and a core network is an Iu bearer (the interface between a radio network controller and a core network is called the Iu interface). A service is something that necessitates information transfer between a mobile station and the fixed parts of the system, like a phone call or the transfer of a text message. A major task for the operation of a third generation mobile telecommunications system is to manage (set up, keep up and tear down as necessary) the bearers so that each requested service can be provided to the mobile stations without wasting the available bandwidth. Some of the problems of bearer management will be illustrated in the following by referring to packet-switched data transmission finctions, where one of the most difficult tasks is to provide a truly reliable QoS for each user. The general packet radio service (GPRS) is a new service to the GSM system, and is one of the objects of the standardization work of the GSM phase 2+ and UMTS at the ETSI (European Telecommunications Standards Institute). The GPRS operational environment comprises one or more subnetwork service areas, which are interconnected by a GPRS backbone network. A subnetwork comprises a number of packet data service nodes (SN), which in this application will be referred to as serving GPRS support nodes (SGSN), each of which is connected to the mobile telecommunications system (typically to a base station through an interworking unit) in such a way that it can provide a packet service for mobile data terminals via several base stations, i.e. cells. The intermediate mobile communication network provides packet-switched data transmission between a support node and mobile data terminals. Different subnetworks are in turn connected to an external data network, e.g. to a public switched data network (PSDN), via GPRS gateway support nodes GGSN. The GPRS service thus allows to provide packet data transmission between mobile data terminals and external data networks when the appropriate parts of a mobile telecommunications system function as an access network.

In order to access the GPRS services, a MS shall first make its presence known to the network by performing a GPRS attach. This operation establishes a logical link between the MS and the SGSN, and makes the MS available for SMS (Short Message Services) over GPRS, paging via SGSN, and notification of incoming GPRS data. More particularly, when the MS attaches to the GPRS network, i.e. in a GPRS attach procedure, the SGSN creates a mobility management context (MM context). Also the authentication of the user is carried out by the SGSN in the GPRS attach procedure. In order to send and receive GPRS data, the MS shall activate the packet data address that it wants to use, by requesting a PDP activation procedure (Packet Data Protocol). This operation makes the MS known in the corresponding GGSN, and interworking with external data networks can commence. More, particularly a PDP context is created in the MS and the GGSN and the SGSN. The PDP context defines different data transmission parameters, such as the PDP type (e.g. X.25 or IP), PDP address (e.g. X. 121 address), quality of service (QoS) and NSAPI (Network Service Access Point Identifier). The MS activates the PDP context with a specific message, Activate PDP Context Request, in which it gives information on the TLLI, PDP type, PDP address, required QoS and NSAPI, and optionally the access point name (APN).

The quality of service defines how the packet data units (PDUs) are handled during the transmission through the GPRS network. For example, the quality of service levels defmed for the PDP addresses control the order of transmission, buffering (the PDU queues) and discarding of the PDUs in the SGSN and the GGSN, especially in a congestion situation. Therefore, different quality of service levels will present different end-to-end delays, bit rates and numbers of lost PDUs, for example, for the end users.

For each PDP address a different QoS may be requested. For example, some PDP addresses may be associated with E-mail that can tolerate lengthy response times. Other applications cannot tolerate delay and demand a very high level of throughput, interactive applications being one example. These different requirements are reflected in the QoS. If a QoS requirement is beyond the capabilities of a PLMN, the PLMN negotiates the QoS as close as possible-to the requested QoS. The MS either accepts the negotiated QoS, or deactivates the PDP context.

Current GPRS QoS profile contains five parameters: service precedence, delay class, reliability, and mean and peak bit rates. Service precedence defines some kind of priority for the packets belonging to a certain PDP context. Delay class defines mean and maximum delays for the transfer of each data packet belonging to that context. Reliability in turn specifies whether acknowledged or unacknowledged services will be used at the protocol layers where such alternatives are available—examples in the known systems are the LLC (Logical Link Control) and RLC (Radio Link Control) layers. In addition, it specifies whether protected mode should be used in case of unacknowledged service, and whether the GPRS backbone should use TCP or UDP to transfer data packets belonging to the PDP context. Furthermore, these varying QoS parameters are mapped to a number of QoS levels available at certain protocol layers.

Figure 1:
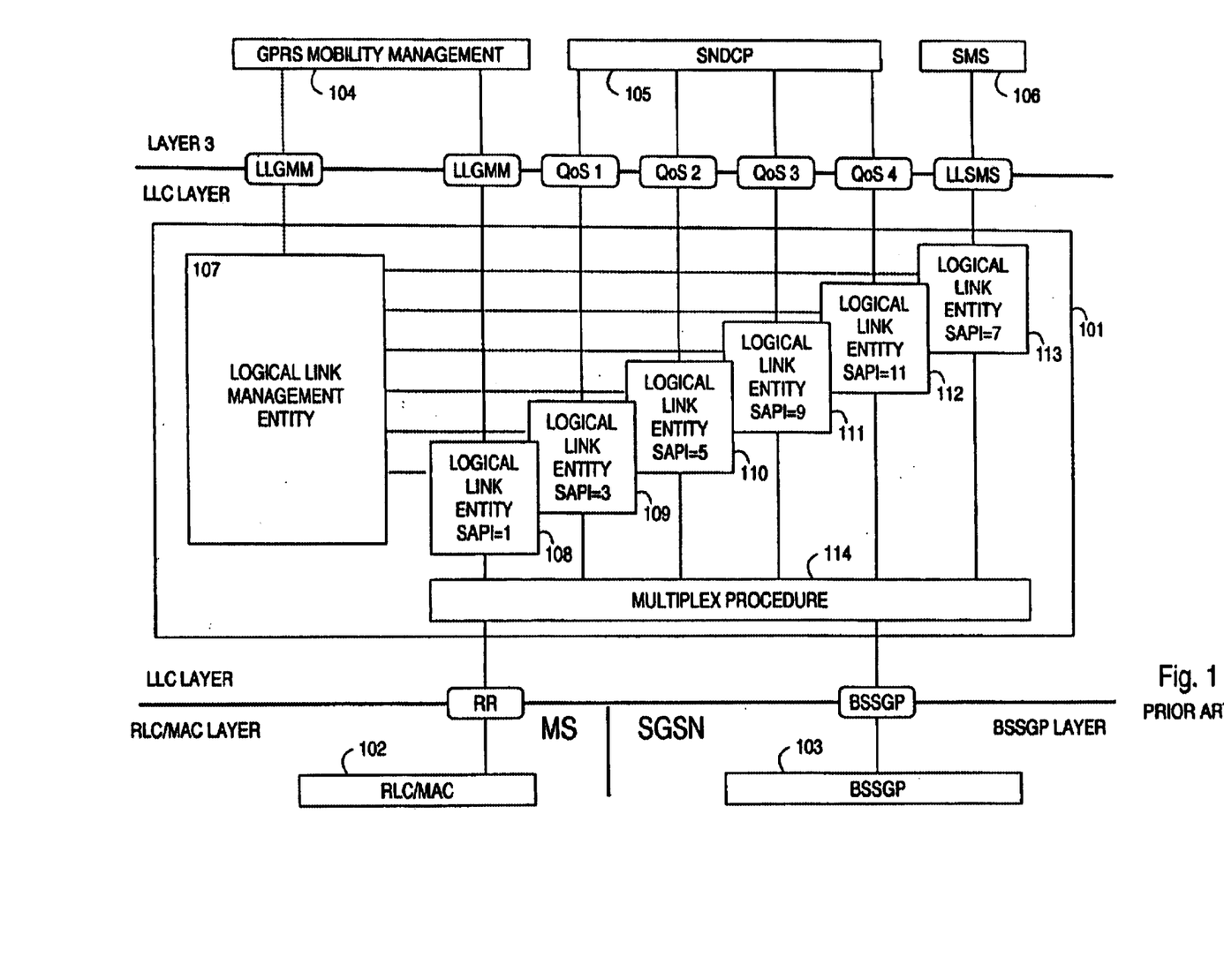
FIG. 1 illustrates a known LLC protocol layer.

The known aspects of bearer management and QoS mapping are usually associated with the LLC layer. It has been proposed that the LLC layer should be omitted from future wireless packet-switched communication systems, but the following considerations are in any case useful in understanding the background of the invention. FIG. 1 illustrates the operation of a known LLC protocol layer 101 in a known Mobile Station (MS) or Serving GPRS Support Node (SGSN). Block 102 represents the known lower layer (RLC/MAC; Radio Link Control/Media Access Control) functions that are needed below the LLC layer 101 in a mobile station. Correspondingly block 103 represents the known lower layer (BSSGP; Base Station Subsystem GPRS Part) finctions that are needed below the LLC layer 101 in a SGSN. The interface between the LLC layer 101 and the RLC/MAC layers is called the RR interface and the interface between the LLC layer 101 and the BSSGP layers is called the BSSGP interface.

Above the LLC layer there are the known GPRS Mobility Management functions 104, Subnetwork Dependent Convergence Protocol (SNDCP) finctions 105 and Short Messages Services finctions 106 that belong to Layer 3 in the layered protocol structure that is employed. Each one of these blocks has one or more interfaces with the LLC layer 101, connecting to its different parts. The Logical Link Management Entity 107 has an LLGMM control interface (Logical Link-GPRS Mobility Management) with block 104. Mobility management data is routed through a LLGMM data interface between block 104 and the first Logical Link Entity 108 of the LLC layer. The second 109, third 110, fourth 111 and fifth 112 Logical Link Entities connect to block 105 through the corresponding interfaces; according to the QoS levels handled by each of the Logical Link Entities the interfaces are known as QoS 1, QoS 2, QoS 3 and QoS 4. The sixth Logical Link Entity 113 of the LLC layer connects to block 106 via an LLSMS interface (Logical Link-Short Messages Services). The Service Access Point Identifiers or SAPIs of the first 108, second 109, third 110, fourth 111, fifth 112 and sixth 113 Logical Link Entities are respectively 1, 3, 5, 9, 11 and 7. Each one of them is connected inside the LLC layer to a multiplexing block 114, which handles the connections through the RR interface to block 102 in a mobile station or the connections through the BSSGP interface to block 103 in an SGSN.

The connection between the multiplexing block 114 and the lower layer block 102 in the MS may be described as a "transmission pipe". Because all data flows between the upper parts of the LLC layer and the lower layers 102 go through the same multiplexing procdure 114 and the same transmission pipe, the maximum bit rate and mean bit rate parameters of the available QoS profile relate to this transmission pipe. However, the GPRS standard does not define this relation clearly. The QoS profile is negotiated during the PDP activation procedure referred to above, and it can not be changed after initial assignment. For example it is not possible to change the maximum bit rate and/or the mean bit rate according to the momentary needs of the user otherwise than below a certain maximum negotiated at the activation of the PDP context. Although this problem has been described in context of GPRS services, it applies generally to all such mobile telecommunications systems where different services will require different QoS profiles but their relation to the information exchange between the Logical Link Control layer and the lower layers have been poorly and/or inflexibly defined.

SUMMARY OF THE INVENTION

It is thus an object if this invention to provide a method and a system for managing the bearers in a mobile telecommunications system so that the changing data transmission needs of a user during a connection may be accounted for.

The objects of the invention are fulfilled by having several parallel transmission pipes, corresponding to different QoS profiles, within the layered protocol structure and forwarding the QoS needs of the services and/or applications to a Call Management entity which then increases or decreases the capacity of each transmission pipe according to need.

It is characteristic to a method according to the present invention that it comprises the steps of a) demultiplexing a flow of data to be transmitted coming from the L3 layer into a number of component data flows, each component data flow having a certain Quality of Service requirement, b) arranging the component data flows into groups where the Quality of Service requirement of each component data flow in a group is similar to the Quality of Service requirements of the other component data flows belonging to the same group, c) multiplexing the component data flows groupwise into multiplexed data flows and d) outputting the multiplexed data flows to the MAC layer.

The invention also applies to a telecommunication device having the characteristic means for demultiplexing a flow of data to be transmitted coming from the L3 layer of a protocol stack into a number of component data flows, each component data flow having a certain Quality of Service requirement, arranging the component data flows into groups where the Quality of Service requirement of each component data flow in a group is similar to the Quality of Service requirements of the other component data flows belonging to the same group, multiplexing the component data flows groupwise into multiplexed data flows and outputting the multiplexed data flows to the MAC layer of said protocol stack.

According to the invention the protocol layers including the known Layer 3 and the known MAC layer are structured so that an incoming data flow from Layer 3 is demultiplexed into its potential component data flows which may have mutually different QoS requirements, the resulting component data flows are processed and the processed component data flows originating from different incoming data flows but having similar QoS requirements are multiplexed together before directing them further to the MAC layer.

The QoS requirements that can be taken into account are mainly related to the expected delay and the used coding. The invention does not restrict the choice of network element to which the invention is applied, but it should be noted that not all network elements include all protocol layers. A certain protocol layer in a certain mobile station or a fixed part of the network has in most cases a peer entity in some other device it is communicating with. According to a preferred embodiment of the invention the multiplexed bitstream of data flows having similar QoS requirements will be conveyed through the whole mobile telecommunications system and demultiplexed again only at the PDAN (Packet Data Access Node) or the WMSC (Wireless/Mobile Switching Centre) from which the component data flows continue in a network where their specific QoS requirements are independently accounted for.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 2:
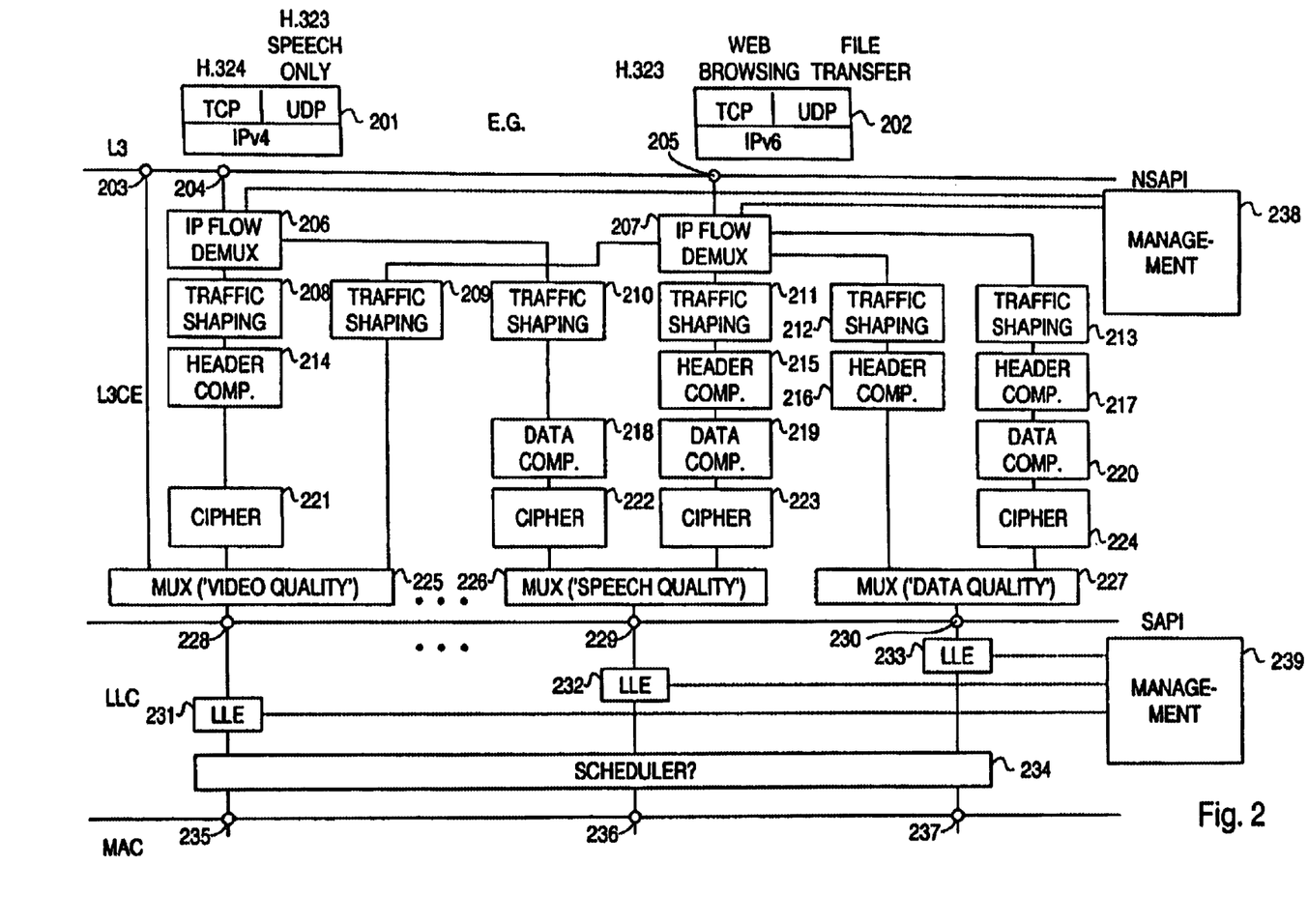
FIG. 2 illustrates protocol layers according to an embodiment of the invention.

FIG. 2 illustrates the novel and inventive protocol layers that should replace the previously known LLC layer of FIG. 1 in a certain embodiment of the present invention. At the top of FIG. 2 there are shown two blocks 201 and 202 that represent data flows coming from an upper protocol layer, i.e. Layer 3 (also known as L3 for short). In FIG. 2 the data flows are shown to be arranged according to IPv4 (Internet Protocol version 4; block 201) and IPv6 (Internet Protocol version 6; block 202), but the invention is not restrictive in relation to which protocol has been used to compose the upper layer data flows; also a merely unspecified data flow is shown on the far left. The NSAPs or Network Service Access Points 203, 204 and 205 through which the upper layer data flows enter the L3CE layer (Layer 3 Compatibility Entity) are identified by NSAPIs or Network Service Access Point Identifiers. The invention does not limit the number of NSAPs that can be used at the top of the L3CE layer.

Inside the L3CE layer those upper data flows that may contain component data flows with different QoS requirements are resolved into the appropriate component data flows in demultiplexers 206 and 207. In FIG. 2 it has been expected that the IPv4 data flow originating from block 201 contains two component data flows and the IPv6 data flow originating from block 202 contains four component data flows. Additionally it has been expected that the first component data flow of the IPv4 data flow has similar QoS requirements as the first component data flow of the IPv6 data flow and the unspecified data flow coming through NSAP 203; the second component data flow of the IPv4 data flow has similar QoS requirements as the second component data flow of the IPv6 data flow; and the third and fourth component data flow of the IPv6 data flow have mutually similar QoS requirements. Each demultiplexed component data flow is conveyed from demultiplexer 206 or 207 to its own traffic shaping block 208, 209, 210, 211, 212 or 213 for traffic shaping known a such. Other processing options that are available for processing the component data flows are for example header compression, data compression and ciphering. The invention does not limit the number, order or nature of processing options applied to any component data flow; the exemplary combinations shown in FIG. 2 are header compression 214+ciphering 221, data compression 218+ciphering 222, header compression 215+data compression 219+ciphering 223 (or 217+220+224) header compression only 216 or no processing at all.

After processing (if any) on the component data flow level those processed component data flows are multiplexed together that have similar QoS requirements. In FIG. 2, multiplexer 225 is used to multiplex the unprocessed, unspecified data flow coming through NSAP 203 and the processed first component data flows originating from each IPvX data flow, where X is either 4 or 6. Multiplexer 226 is used to multiplex the processed second component data flows originating from each IPvX data flow and multiplexer 227 is used to multiplex the processed third and no. fourth component data flows originating from the IPv6 data flow. The invention does not limit the number of parallel multiplexers used at this stage; in the most. versatile system according to the invention their number should be the same as the largest possible number of simultaneous data flows that have different QoS requirements, or, if two separate protocol entities are needed to account for a connection either to a WMSC or a PDAN, twice the largest possible number of simultaneous data flows that have different QoS requirements. Each multiplexed data flow will be directed downwards in the protocol hierarchy through a SAP (Service Access Point) to the next lowest layer. The SAPs 228, 229 and 230 used are identified by SAPIs (Service Access Point Identifiers).

FIG. 2 shows an LLC layer as an exemplary lower layer, although it should be noted that the invention does not require the use of an LLC layer at all. The LLC layer in FIG. 2 houses a separate Logical Link Entity for each multiplexed data flow, of which the LLEs 231, 232 and 233 are shown. A scheduler 234 may be used to schedule the transmission of the outputs of the LLEs to the closest lower layer (the MAC layer) through points 235, 236 and 237. In an alternative embodiment where there is no LLC layer the SAPs 228, 229 and 230 may be the same as the SAPs 231, 232 and 233 so that there is a direct connection from the L3CE layer to the MAC layer.

The multiplexers 225, 226 and 227 are labeled in an exemplary manner as "video quality", "speech quality" and "data quality" respectively. These labels refer to the different QoS requirements of the different component data flows and are not restrictive. Reference is made to the following table, where traffic is classified into four classes: First class, Business class, Tourist class and Cargo. The "video quality" multiplexer 225 corresponds to First class traffic with BER $10^{-5}$, an "audio quality" multiplexer (not shown) could correspond to First class traffic with BER $10^{-3}$, the "speech quality" multiplexer 226 corresponds to First class traffic with some other BER and the "data quality" multiplexer 227 corresponds to Cargo traffic.

| Traffic class | First class | Business class | Tourist class | Cargo |
| --- | --- | --- | --- | --- |
| | conversational RT guaranteed capacity | streaming RT guaranteed capacity | Interactive best effort ARQ interactive | Background best effort ARQ background |

-continued

| Traffic class | First class | Business class | Tourist class | Cargo |
|---|---|---|---|---|
| | no ARQ | ARQ lite (MAC level ?) Add. buffering in application | WWW, Telnet, RT control channel | download of emails, calendar events, ... |
| TRDELAY | 100 ms, 200 ms, 300 ms | <1 s | 2 s | N/A |
| BER | $10^{-3}$, $10^{-4}$, $10^{-5}$, $10^{-6}$ | $10^{-5}$, $10^{-6}$, $10^{-7}$, $10^{-9(*)}$ | $<10^{-9}$ | $<10^{-9}$ |
| MAX BIT RATE | $MAX_{max}$ & $MAX_{min}$ network returns MAX' $MAX_{min}$ < MAX' < $MAX_{max}$ | $MAX_{max}$ & $MAX_{min}$ network returns MAX' $MAX_{min}$ < MAX' < $MAX_{max}$ | N/A () | N/A () |
| USER PRIORITY | High, medium, low | High, medium, low | High, medium, low | High, medium, low |

The operation of the L3CE layer and the LLC layer if any must be managed so that especially the correct demultiplexing operations are used for creating the component data flows and directing them to appropriate processing chains, and the Logical Link Entities or corresponding processing units are aware of the required characteristics at their outputs. A first management block 238 is shown for managing the demultiplexing operation and a second management block 239 is shown for managing the operation of the LLEs.

Figure 3:
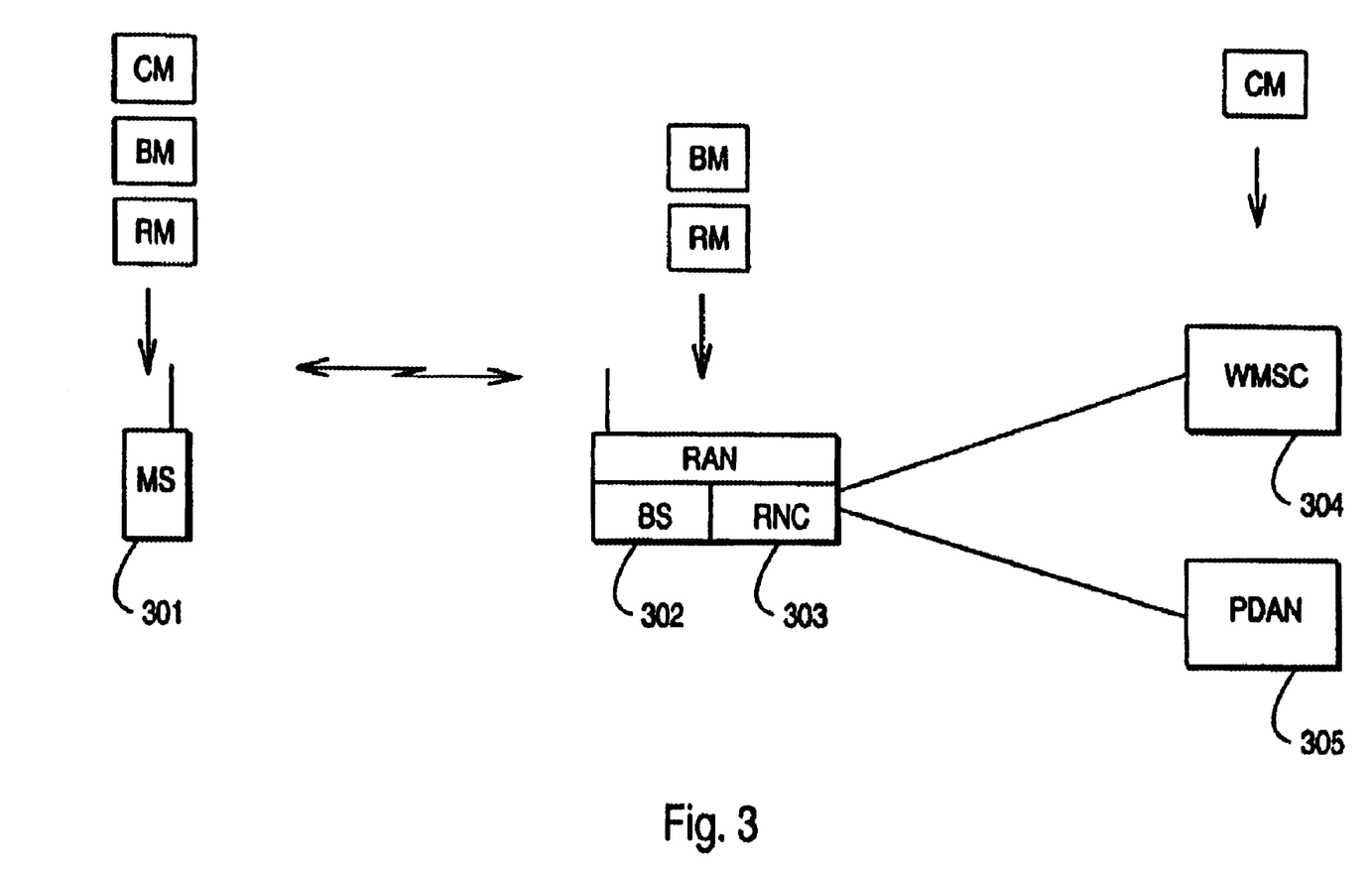
FIG. 3 illustrates a system according to an embodiment of the invention.

The operation of the invention will be described in relation to FIGS. 3 and 4. FIG. 3 shows a part of an UMTS system comprising a mobile station 301, a radio access network comprising a base station 302 and a radio network controller 303 controlling the base station and routing the connections between it and the rest of the system, and a WMSC 304 and a packet data access node 305 as alternative routing possibilities beyond the radio network controller. In FIG. 3 it has been expected that the Call Management (CM) functions are implemented in the mobile station 301 and both in the WMSC 304 and the packet data access node 305, and the Bearer Management (BM) and the Radio resource Management (RM) functions are implemented in the mobile station 301 and in the radio network controller 303. In the following description it will be expected that the user of the mobile station 301 has firstly no active connections to any other parts of the network, then he initiates an audio connection to an IP network requiring a bit rate of 30 kbit/s, subsequently he initiates additionally an H.323 audio connection to the IP network requiring an additional bit rate of 10 kbit/s and finally he terminates the first audio connection leaving only the H.323 audio connection active.

An audio connection and an H.323 audio connection are both real-time services requiring a very short delay but tolerating a moderate bit error ratio, so they may both be classified as requiring "audio quality".

At the moment when the user expresses his wish to activate an audio connection of 30 kbit/s, a notification is sent to the Call Management block in the mobile station which checks through the Bearer Management block, what kind of connections the user has already active. Above it was expected that the user did not have any active connections before the audio connection so the Call Management block will ask the Bearer Management block to set up the necessary bearers together with its peer entity in the radio network controller. A radio bearer will be needed between the mobile station and the base station subsystem: this belongs to the responsibility of the Radio resource Management level so the Bearer Management block will ask it to set up a radio bearer of 30 kbit/s. A bearer of 30 kbit/s for audio traffic must also be set up over the Iu interface between the radio network controller and the core network it connects to: this the Bearer Management block of the radio network controller takes care of after contacted by the Bearer Management block of the mobile station. After the Bearer Management level has accomplished the task of setting up the bearers, it will inform the Call Management level, whereby the connection has been established according to the wish expressed by the user.

The following stage in the example is the one where the user requests for an additional H.323 audio connection of 10 kbit/s. A notification is again sent to the Call Management block which checks through the Bearer Management block, what kind of connections the user has already active. The Bearer Management block will notice that the user has already an active connection with similar QoS requirements. so it will ask the Radio resource Management level to increase the "width" of the radio bearer to 40 kbit/s. Simultaneously the Bearer Management block of the radio network controller increases the "width" of the Iu bearer to 40 kbit/s. Thereafter the Bearer Management level informs the Call Management level that the bearers have been updated to house the new connection.

At the last stage of the example the user terminates the 30 kbit/s connection but leaves the 10 kbit/s connection active. The Call Management entity will ask the Bearer Management block to release the resources allocated to the 30 kbit/s connection, whereby the Bearer Management level will first ask the Radio resource Management level to narrow down the radio bearer to 10 kbit/s. The Bearer Management block of the radio network controller will also narrow down the Iu bearer to 10 kbit/s.

Figure 4:
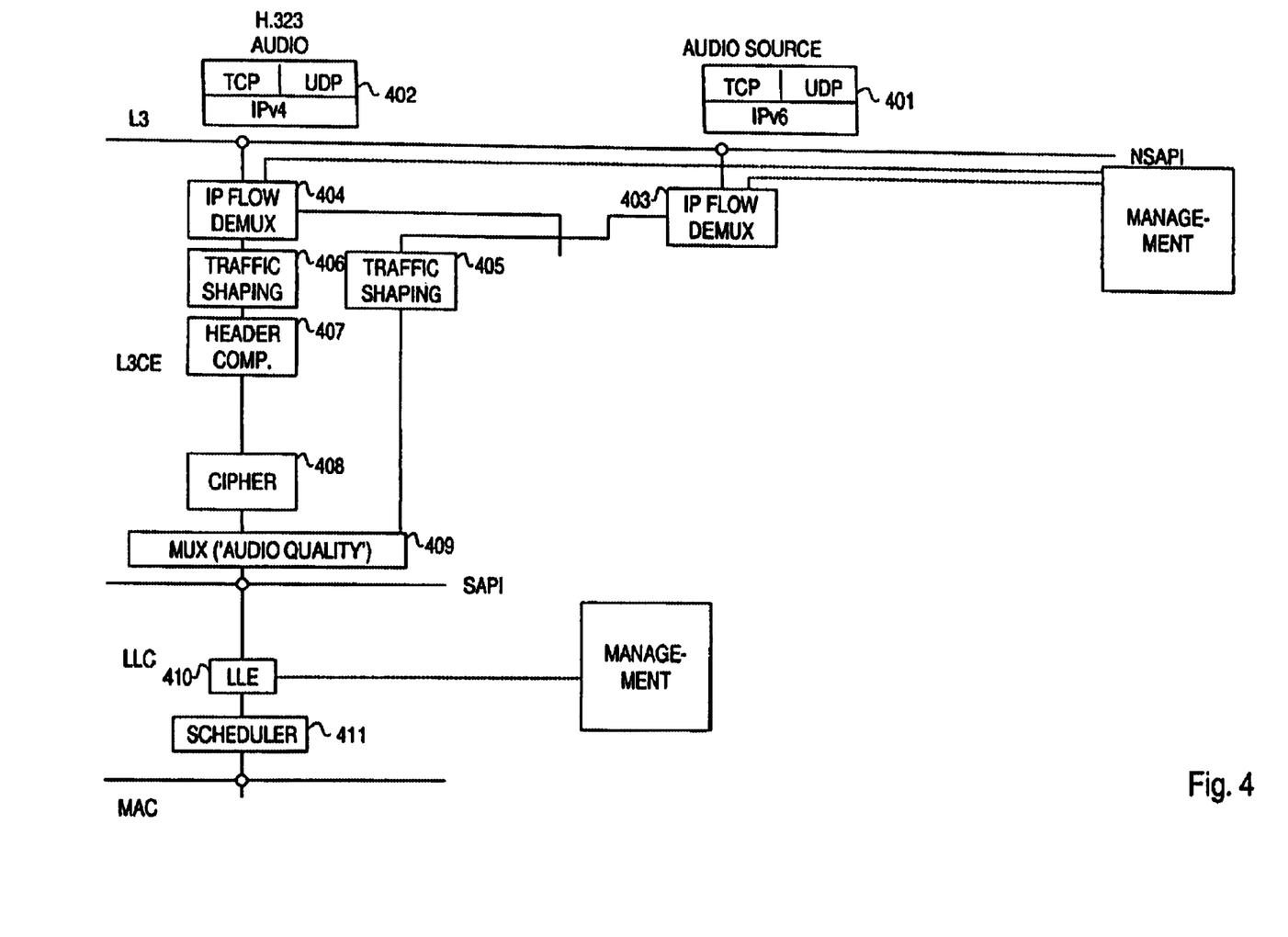
FIG. 4 illustrates parts of FIG. 2 as an example.

In FIG. 4 the audio connection has its audio information source within block 401 and the H.323 audio connection originates in block 402; actually the source of the information may be somewhere else but the simplified block representation is useful for understanding the invention. Both data flows have their own demultiplexers 403 and 404 respectively. In this case the data flows coming from the L3 layer consist of only one component stream each, meaning that the demultiplexing operation in demultiplexers 403 and 404 is merely the same as directing the data flow into the correct traffic shaping block 405 or 406. The data flow relating to the H.323 audio connection undergoes header compression in block 407 and ciphering in block 408, and the data flows are multiplexed in a common multiplexer 409 because both have similar QoS requirements. Taken that the setting up and tearing down of the connections follow the above-given order, it should be noted that first (after the initial audio connection activation) there is only one input to multiplexer 409, namely the component data flow coming from demultiplexer 403 through traffic shaper 405. Thereafter there are both of the two inputs to multiplexer 409 for a while, until after the termination of the audio connection only the component data flow relating to the H.323 audio connection remains.

Figure 5:
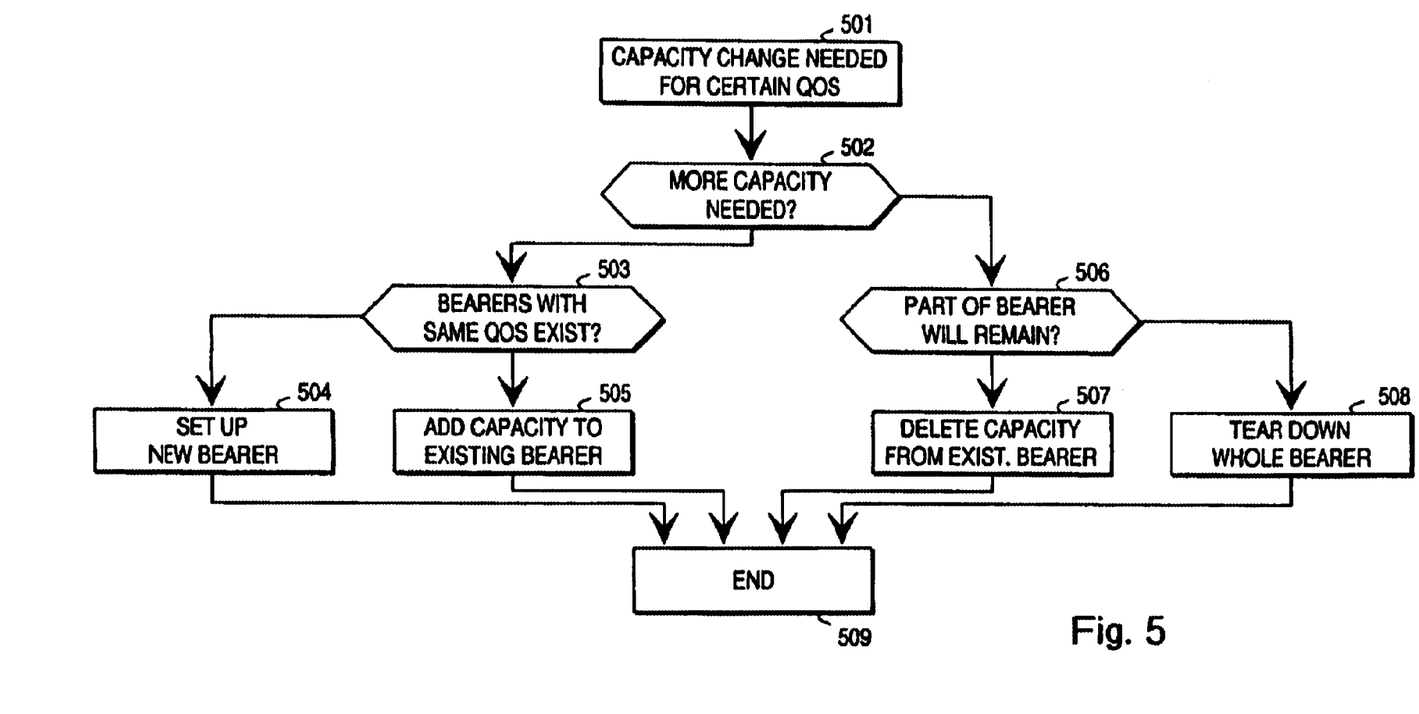
FIG. 5 illustrates an aspect of a method according to the invention.

FIG. 5 is a flow diagram that illustrates the alternatives of operation when bearers relating to certain QoS are handled according to an advantageous embodiment of the invention. At state 501 there is noticed that a change is needed in the amount of data transfer capacity currently allocated to services with a certain QoS determination. Stage 502 is a decision step where it is determined whether the change means an addition of allocated capacity (positive decision at stage 502) or the cancellation of a part of the previous allocations (negative decision at stage 502). Comparing with the example discussed above, both the moment when the user expresses his wish to activate an audio connection of 30 kbit/s and the one where the user requests for an additional H.323 audio connection of 10 kbit/s cause a transition from stage 501 to stage 502 and further to stage 503, where the Call Management functionality checks through the Bearer Management functionality the potential availability of previous bearers with the same QoS. If there are no such bearers available, a new bearer is set up according to stage 504; this is the case of activating the audio connection of 30 kbit/s above. If at stage 503 it is found out that a previous bearer with the same QoS already exists, the "width" or data transfer capacity of the bearer is increased at stage 505. This is the case when the H.323 audio connection of 10 kbit/s is additionally set up in the previous example.

A negative decision at stage 502 means that capacity allocations should be cancelled rather than added, corresponding to the moment in the previous example when the user terminates the 30 kbit/s connection but leaves the 10 kbit/s connection active. At stage 506 a decision is made either to cancel a part of the previous allocations (stage 507) or to tear down a whole bearer (stage 508) if the required decrease in capacity means that a certain bearer with a certain QoS is not needed at all any more. From each of the stages 504, 505, 507 and 509 there is a transfer to the end stage 509, after which a new round starting from stage 501 is immediately possible.

The invention has several advantageous features:

The number of objects and/or processes belonging to certain protocol layers is relatively small. In a mobile station the number of LLE's and RLCP (Radio Link Control Protocol) objects and/or processes is meant, in a radio network controller the number of RLCP objects and/or processes is meant and in a PDAN the number of LLE's is meant. If the multiplexing of data flows having different QoS would be perfomed on the MAC level, for example, the number of the objects and/or processes would not be limited by anything; it would be directly proportional to the number of simultaneous connections. Having a limited number of objects and/or processes sets more relaxed requirements to the processing capability and memory size of the devices concerned, which is a major advantage at least in the mobile station where these resources are scarce.

Because the handling of all component data flows requiring similar QoS has been combined, only few LLE objects are needed to handle transmissions where acknowledgement (ARQ) is required. Especially with selective acknowledgement schemes the overhead caused by acknowledgement frames gets smaller.

If the multiplexing of data flows having different QoS would be perfomed on the MAC level, a mechanism should be devised to include into each MAC frame information about to which data flow the MAC frame belongs. Such overhead is not needed in the invention, because the existing NSAPI, DCOMP or PCOMP information in the L3CE frames is sufficient to identify the conect data flow.

On the network side the invention enables easier handling of the "transmission pipes" at the Iu interface between a radio network controller and a core network. The number of "transmission pipes" relating to one user is smaller which makes for example handovers easier. Additionally the required size of buffers in the radio network controller is smaller than if the multiplexing of data flows having different QoS would be perfomed on the MAC level.

As discussed above, the processing of information to be transmitted in a telecommunication device takes place in an arrangement of processing capacity in the form of microprocessor(s) and memory in the form of memory circuits. Such arrangements are known as such from the technology of mobile stations and fixed network elements. To convert a known telecommunication device into a telecommunication device according to the invention it is necessary to store into the memory means a set of machine-readable instructions that instruct the microprocessor(s) to perform the operations described above with reference to FIGS. 2 to 4. Composing and storing into memory of such instructions involves known technology which, when combined with the teachings of this patent application, is within the capabilities of a person skilled in the art.

What is claimed is:

1. Method for handling data flows in a telecommunication device, in which method the handling of data to be transmitted proceeds according to a protocol stack having a L3 layer and a MAC layer, comprising between the top of the L3 layer and the bottom of the MAC layer the steps of
    a) demultiplexing an L3 layer flow of data to be transmitted into a number of component data flows, each component data flow having a certain Quality of Service requirement,
    b) arranging the component data flows into groups where the Quality of Service requirement of each component data flow in a group is similar to the Quality of Service requirements of the other component data flows belonging to the same group,
    c) multiplexing the component data flows groupwise into multiplexed data flows and
    d) outputting the multiplexed data flows to the MAC layer.

2. Method according to claim 1, additionally comprising between steps a) and b) a step of processing the component data flows.

3. Method according to claim 2, wherein said processing comprises at least one of the following operations: traffic shaping, header compression, data compression, ciphering.

4. A method for altering the allocations of data transfer capacity in a telecommunication system where the mutual communication of a terminal device and a network device is arranged into bearers, each bearer being associated with a certain quality of service, comprising the steps of
    a) deciding, whether a certain alteration in the allocation of data transfer capacity means the need for more allocated capacity with a certain quality of service,
        b1) as a response to a positive decision at step a), deciding, whether there already exists a certain first bearer associated with said quality of service between the terminal device and the network device,
            c1) as a response to a positive decision at step b1), increasing the capacity of said existing first bearer,
            c2) as a response to a negative decision at step b1), setting up a new bearer between the terminal device and the network device,
        b2) as a response to a negative decision at step a), deciding, whether said alteration in the allocation of data transfer capacity means the complete termination for a need of a certain existing second bearer, c3) as a response to a negative decision at step b2), reducing the capacity of said existing second bearer, and c4) as a response to a positive decision at step b2), tearing down said existing second bearer.

5. A telecommunication device for handling information to be transmitted in the form of data flows and processing information to be transmitted according to a predetermined protocol stack including an L3 layer and a MAC layer, comprising means for demultiplexing an L3 layer flow of data to be transmitted into a number of component data flows, each component data flow having a certain Quality of Service requirement, means for arranging the component data flows into groups where the Quality of Service requirement of each component data flow in a group is similar to the Quality of Service requirements of the other component data flows belonging to the same group, means for multiplexing the component data flows groupwise into multiplexed data flows and means for outputting the multiplexed data flows to the MAC layer of said protocol stack.

* * * * *